United States Patent
Clark et al.

(10) Patent No.: US 6,271,802 B1
(45) Date of Patent: Aug. 7, 2001

(54) THREE DIMENSIONAL MICROMACHINED ELECTROMAGNETIC DEVICE AND ASSOCIATED METHODS

(75) Inventors: Rodney L. Clark, Gurley; Robert N. Dean, Jr., Madison, both of AL (US)

(73) Assignee: MEMS Optical, Inc., Huntsville, AL (US)

( * ) Notice: Subject to any disclaimer, the term of this patent is extended or adjusted under 35 U.S.C. 154(b) by 0 days.

(21) Appl. No.: 09/058,843

(22) Filed: Apr. 13, 1998

Related U.S. Application Data

(60) Provisional application No. 60/043,005, filed on Apr. 14, 1997.

(51) Int. Cl.$^7$ ........................................................ B05D 3/02
(52) U.S. Cl. ........................... 343/895; 427/587; 427/250
(58) Field of Search ..................................... 374/121, 176; 250/332, 338.4; 427/38, 587, 250; 118/726; 343/895

(56) References Cited

U.S. PATENT DOCUMENTS

| | | | |
|---|---|---|---|
| 4,942,057 | * 7/1990 | Steinwandel et al. | 427/38 |
| 5,147,819 | * 9/1992 | Yu et al. | 437/173 |
| 5,164,222 | * 11/1992 | Gottsleben et al. | 427/587 |
| 5,171,733 | * 12/1992 | Hu | 505/1 |
| 5,760,398 | * 6/1998 | Blackwell et al. | 250/332 |

* cited by examiner

*Primary Examiner*—Don Wong
*Assistant Examiner*—James Clinger

(57) ABSTRACT

A micro-electromagnetic device having a three dimensional structure is formed using laser chemical vapor deposition on a conductive surface. Arrays of electromagnetic devices may be formed. Various techniques for facilitating deposition on the conductive surface may be used. A helical antenna for use in the THz region may be formed in accordance with the laser chemical vapor deposition. The antenna is preferably formed on a bolometer.

20 Claims, 8 Drawing Sheets

US 6,271,802 B1

THREE DIMENSIONAL MICROMACHINED ELECTROMAGNETIC DEVICE AND ASSOCIATED METHODS

This application claims priority under 35 U.S.C. § 119(e) of U.S. Provisional application 60/043,005 filed on Apr. 14, 1997.

GOVERNMENT RIGHTS

The U.S. Government has rights in the present application under Contract #F33615-97-C-1101.

FIELD OF THE INVENTION

The present invention is directed to a method for making a true three-dimensional (3D) electromagnetic device, e.g., a micro-antenna, and the device made thereby. The present invention is directed to a method of for making a true 3 D electromagnetic device which exhibits wideband impedance characteristics, circular polarization, allows a simple feed network and left and right polarizations are easily realized. The present invention is further directed to making a helical micro-antenna, which is particularly advantageous for use in the THz frequency range and the antenna made thereby.

BACKGROUND OF THE INVENTION

Antennas have been in existence for many years. Planar and whisker antennas have been used in research of the low THz frequency range for some time. The THz region is of interest, for example, in MRI applications. Current art uses planar microstrip antennas. The current antennas do not provide a true 3 D structure needed for performance under certain conditions, e.g., circular polarization in the THz frequency range.

A low-cost method for successfully fabricating arrays of true 3-D helical antennas for this frequency range could greatly increase the usefulness of the THz frequency range, due to increased antenna gain and the ability to generate circular polarized radiation patterns. Further, other applications requiring a 3 D electromagnetic device would benefit from such a low cost method.

SUMMARY OF THE INVENTION

Therefore, it is an object of the present invention to provide a three dimensional micro-electromagnetic device. It is further an object of the present invention to provide a method for making a three-dimensional micro-electromagnetic device. It is another object of the present invention to provide configurations for reducing energy required to initiate deposition on a thermally conducting substrate.

One or more of these objects, as well as other objects, may be realized by a method of forming a three-dimensional electromagnetic device including providing a conductive surface and laser chemical vapor depositing a three-dimensional structure on the conductive surface, thereby forming the electromagnetic device. A column may be formed on a semiconductor substrate and the depositing initiated on the column. The electromagnetic device may be an antenna, with the conductive surface serving as a ground plane for the antenna.

The providing may include forming a bolometer and the deposition forms the three dimensional structure on the bolometer. The method may farther include forming a pit under the center of the bolometer and performing the deposition on a portion of the bolometer over the pit. The forming of the bolometer may further include suspending the bolometer on a conductive substrate. A compensating bolometer for the antenna may be formed.

The electromagnetic device formed may be an array of electromagnetic devices. The deposition of each device of the array may be performed simultaneously.

One or more of these objects, as well as other objects, may be realized by growing three-dimensional structures on a thermally conductive substrate including forming a column on the thermally conductive substrate and laser chemical vapor deposition the three dimensional structure, including focussing a laser beam on the column. The forming may include providing a tip on the column with a diameter which is less than the diameter of the focal point of the laser. The forming may include providing a column having a height which is at least four times its diameter.

One or more of these objects, as well as other objects, may be realized by an electromagnetic device including a conductive surface and a fiber grown by laser chemical vapor deposition and having a three-dimensional structure formed on the conductive surface. The three-dimensional structure may be a helix. The helix may be a square helix. The three-dimensional structure may be an array of dipoles. The conductive surface may be a bolometer. The three-dimensional structure may be ferromagnetic. One or more of these objects, as well as other objects, may be realized by a substrate on which a structure grown by laser chemical vapor deposition is to be formed comprising a thermally conductive surface and a thermally conductive column formed on the thermally conductive surface, the structure to be grown starting-up on the thermally conductive column. The tip of the column may have a diameter which is less than the diameter of the focal point of a laser used for the laser chemical vapor deposition. The column may have a height which is at least four times its diameter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The general solution to the problem of forming a true three-dimensional micro-electromagnetic device in accordance with the present invention is to employ Laser Chemical Vapor deposition (LCVD). Therefore, the LCVD process will be discussed generally first, and then the use of the LCVD process to form a 3 D micro-electromagnetic device in accordance with the present invention will be addressed.

The LCVD process can be used to fabricate complex 3-D structures on the surface of a substrate. When combined with well-established micro-machining processes, such as gold electroplating and substrate anisotropic etching, micro-electromagnetic devices, such as dipole and helical antennas, singular or arrayed, can be fabricated on-chip to operate at frequencies ranging from 100 GHz to over 2 THz.

The present invention also addresses problems associated with forming micro-structures with LCVD on a thermally conductive surface. The present invention further addresses problems associated with detecting radiation in the THz region.

Laser Chemical Vapor Deposition (LCVD)

Laser Chemical Vapor Deposition (LCVD) is an established method for fiber synthesis, particularly in the formation of structures with extremely small diameters. In the process, a reactive gas and a gas containing deposition material flow through a reactive chamber or reactor. The reactive chamber houses a surface on which the structure is to be formed. A laser beam is focused to a diffraction limited spot on the surface. Wherever the laser energy is focused, the saturated atmosphere within the reactive chamber is solidified. Thus, a chemical deposition is caused to occur at the small area of focus on the surface. The use of high pressures is essential because it results in large convective heat transfer rates that limit the hot zone where CVD occurs to the diffraction limited laser beam focal spot.

The time required for reactant molecules to diffuse through the thermal boundary layer that surrounds the laser heated end of the 10 $\mu$m diameter structure is approximately $10^{-6}$ seconds when the ambient gas pressure is 1 bar. Homogeneous gas phase reactions do not occur under these conditions, even for highly unstable gases such as ethylene, acetylene, silane, germane, and others. Thus, high reactant pressures and high deposition temperatures may be used and very high rates of deposition are possible.

Figure 1A:
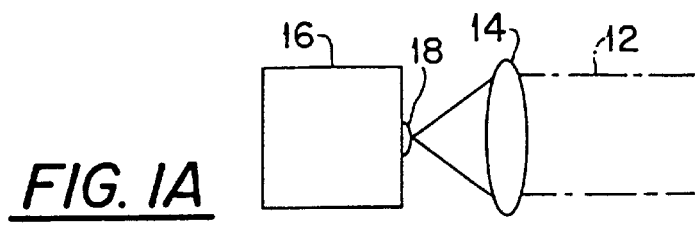
FIGS. 1A–1C are side view of linear fiber growth.
Figure 1B:
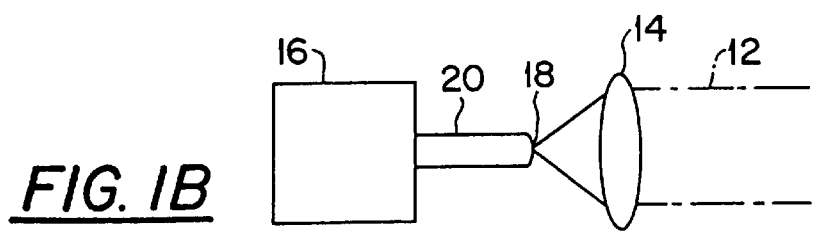
Figure 1C:
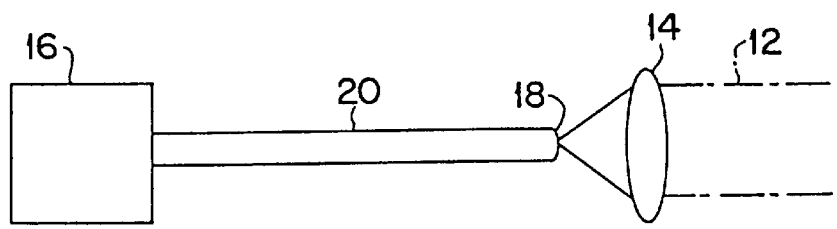

The formation of a straight fiber by LCVD is illustrated in FIGS. 1A–1C. A continuous wave laser beam 12 is focussed by a lens 14 onto a substrate 16. The size of the spot focussed on the substrate 16 depends on the desired diameter of the fiber to be created. In the process, a reactive gas flows through a reactive chamber housing the substrate 16. This reactive gas includes one of the unstable gases noted above mixed with a gaseous deposition material to form the fiber, typically carbon. The laser beam 12 has an intensity sufficient to achieve high temperature for initiation of the deposition process. The particular intensity required depends on the deposition material used, the unstable gas used, the substrate material, the pressure, etc. The temperature required for initiation is typically on the order of 1000° C. This initiation is illustrated in FIG. 1A in which deposition material is deposited on a laser heated region 18 of the substrate 16, i.e., where the laser beam 12 is focussed.

Figure 2:
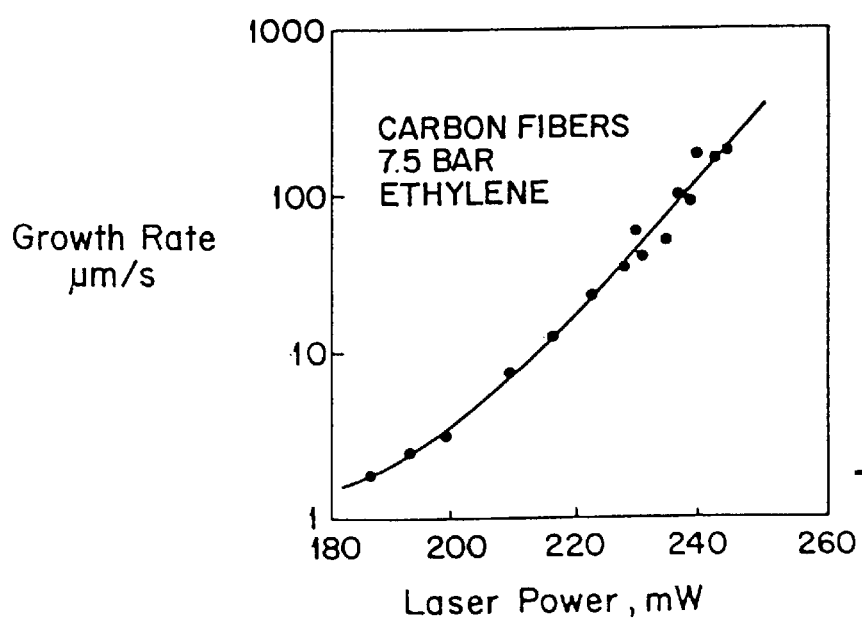
FIG. 2 is a plot of laser power versus growth rate.

Once the growth has been initiated, a fiber 20 is grown by pulling the substrate 16 away from the focus of the laser beam 12, as shown in FIGS. 1B and 1C. Straight fibers will grow to a point if the pulling rate is different than the growth rate. A plot of the required laser power for a desired growth rate is shown in FIG. 2 for growing a carbon fiber in ethylene at a pressure of 7.5 bar.

Reduced laser power may be required as the fiber 20 begins to grow, since heat loss from the laser-heated region 18 decreases as the fiber 20 grows away from the substrate 16. The temperature gradient near the fiber tip is very large so that a constant fiber tip temperature and growth rate are achieved when the fiber length becomes a few times greater than its diameter. The point of deposition remains in the laser heated region 18 as the substrate 16 is withdrawn.

The upper limit on pressure for LCVD is inversely proportional to the diameter of the heated object. Gas phase reactions are minimal or do not occur if the product of pressure and structure diameter is less than about 100 $\mu$m bar. LCVD fiber synthesis at rates up to 1000$\mu$m/s can be achieved.

Linear LCVD at a constant rate requires only a constant laser power, reactor pressure and fiber pulling rate, and location of the deposition point in the region where the laser beam is converging to its focal point. If the pulling rate is too slow, the fiber tip will grow into a region where the laser beam diameter is larger and the intensity is smaller, resulting in a reduced fiber tip temperature and a growth rate that matches the fiber pulling rate. Similarly, the fiber tip will be pulled closer to the focal point and will grow faster to match a pulling rate that is too fast. This intrinsic control mechanism leads to very reproducible and constant fiber growth conditions, allowing synthesis of materials with uniform properties.

Three Dimensional Structure Generation Using LCVD

Figure 3A:
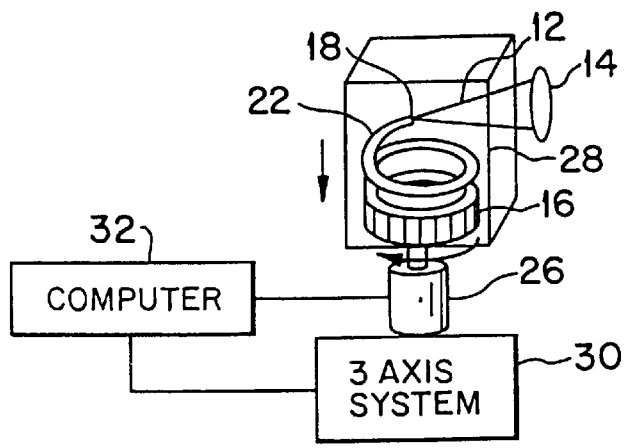
FIG. 3A is a perspective side view of a schematic drawing of the multi-dimensional movement of the substrate relative to the laser focus.
Figure 3B:
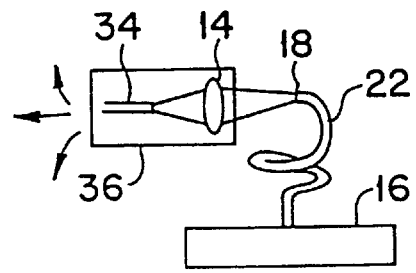
FIG. 3B is a side view of a schematic drawing of another configuration for the multi-dimensional movement of the substrate relative and laser focus relative to one another.

The positive feedback of the linear fiber growth is not present when helical structures are formed, as illustrated in FIGS. 3A–3B. In forming such structures, the substrate is rotated around a desired structure axis and translated along the three orthogonal axes at rates that yield the required helical dimensions.

In forming helical structures, a more extensive control system is required than for linear fiber growth, in which it is sufficient to displace the substrate along the Z-axis. The focus spot and the substrate must rotate, as well as translate along the X-, Y- and Z-axes relative to one another to form a helix.

An example of such a control system is shown in FIG. 3A. A micro-stepping motor 26 is bolted to the base of a reactor 28 containing the substrate on which the fiber is to be grown.

The reactor itself is conventional, consisting of an enclosed structure with ports, not shown, for receiving the gaseous deposition material and the unstable gas. All four walls and the top of the reactor have windows thereon so that the laser beam 12 can enter therethrough. Typically, structures are grown by the LCVD process upon planar substrates whose surface is perpendicular to the axis of the stepper motor shaft 26.

The pivoting reactor 28 and its attached stepper motor 26 are positioned in space by a three-axis microstepping motor system 30, which is bolted to the surface of a large damped-mount optical table, not shown. The LCVD laser and all optics are rigidly mounted on the same table. Thus, the system consists of four axes controlled by a computer 32 in accordance with the shape of the structure to be formed, i.e., the orthogonal X, Y, and Z axes of the three axis system 30 and the rotary θ axis provided by the stepper 26. A pivoting angle of the stepper 26, whose axis is perpendicular to the θ axis, forms a fifth axis that can be adjusted to set a fixed angle of incidence of the laser beam relative to the substrate surface on which the structures are to be formed. In addition to controlling the stepper motors, the computer 32 could also control laser power, gas flow rate and gas pressure, with appropriate connection to these elements, to provide further automation of the growth process.

Since only the relative motion between the focus of the laser and the substrate is important, the motion in the four degrees of freedom may be split between the focus spot and the substrate in numerous ways. Another example is shown in FIG. 3B in which the laser light is delivered to a fiber 34 which is mounted in a housing 36 with the associated optics 14. The required three-dimensional movement in the X,Y and Z-axes is performed by moving the housing 36. The substrate 16 is still mounted on the stepping motor 26, not shown in this drawing, to provide movement in the θ direction. As above, all of these movements are controlled by the computer 32.

Not all of the X,Y, Z movement needs to be performed in the same subsystem. For example, circular motion can be provided to the laser beam focal spot while the substrate is withdrawn in the axial direction. The circular motion of the laser focal point can be achieved by passing the focussed beam through a thin glass plate that is inclined with respect to the laser beam axis. The glass plate is rotated to achieve the circular motion by refractive displacement of the laser beam.

Figure 4A:
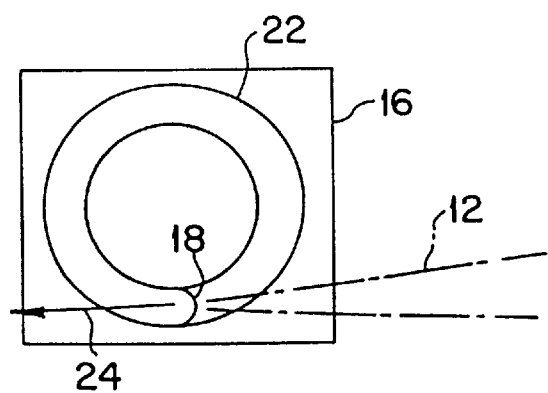
FIG. 4A is a top view of a spherical helix with the pulling direction coincident with the laser beam axis.
Figure 4B:
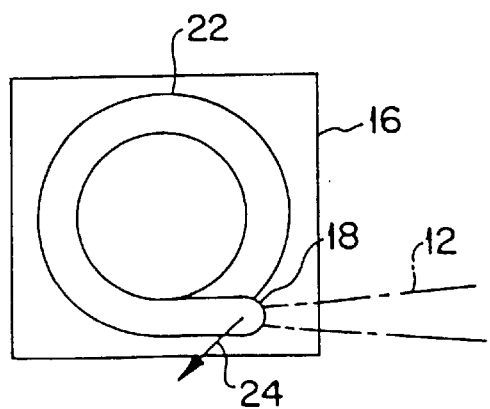
FIG. 4B is a top view of a spherical helix with the pulling direction not coincident with the laser beam axis.

For a spherical helix, a top view of which is shown in FIG. 4A, the pulling direction of helical structure 22 that results from the rotation is coincident with the axis of the laser beam 12 only if a line, indicated by arrow 24, between the point of growth 18 and rotation is perpendicular to the beam direction. The point of deposition 18 needs to be maintained at the focus of the laser beam 12 as the substrate is rotated to insure proper growth of the fiber. Precise control of the growth conditions is required to achieve this condition, and can be achieved by feedback control of either the laser power or rotation rate while sensing the growth point. For example, the natural convection rate increases as the growth point 18 moves further from the substrate 16, resulting in an increased chemical transport rate and, other conditions remaining constant, advance of the growth point 18 to a location further from the focal point of the laser 12 as shown in FIG. 4B. The radial distance from the rotation axis is thereby increased, causing the heated or growth region 18 to move off the laser beam axis. Since the motion induced by rotation is from a region of greater laser intensity to one of smaller laser intensity, the feedback is negative and the growth process may terminate without precise control of the laser intensity and/or rotation rate.

Figure 5A:
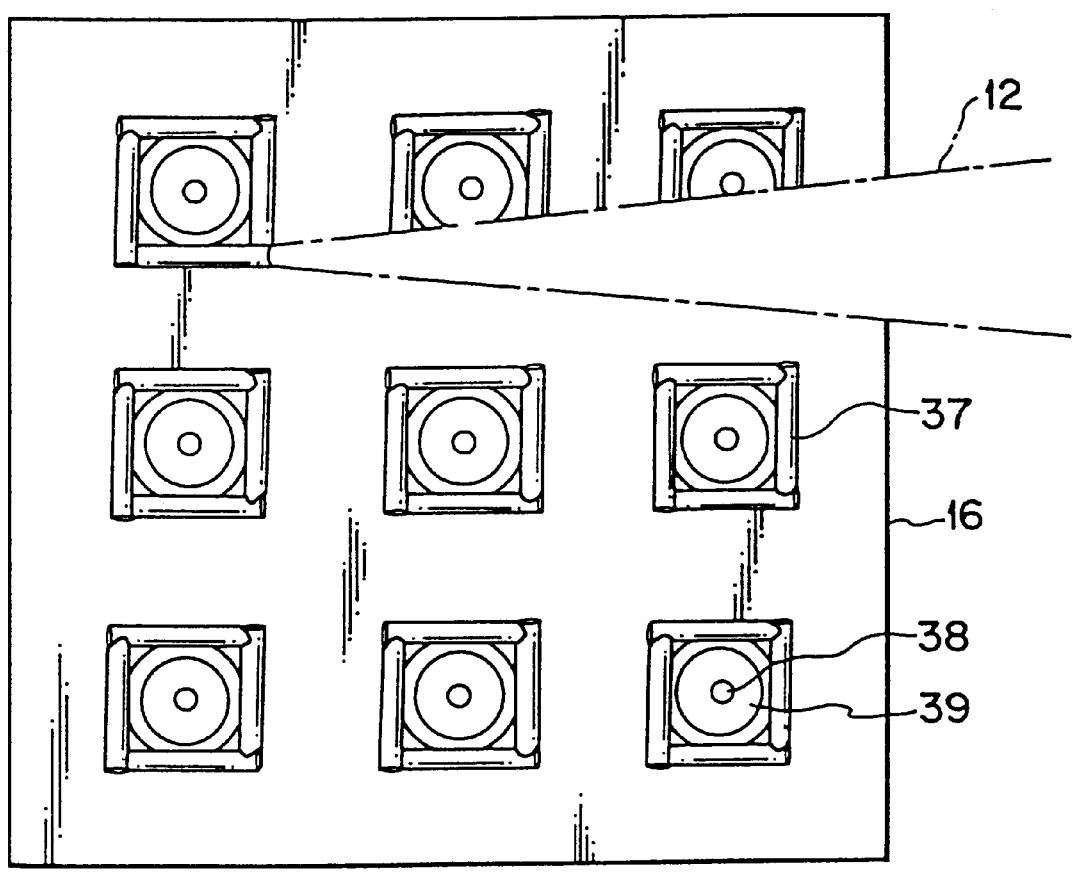
FIG. 5A is a top view of an array of square spirals.
Figure 5B:
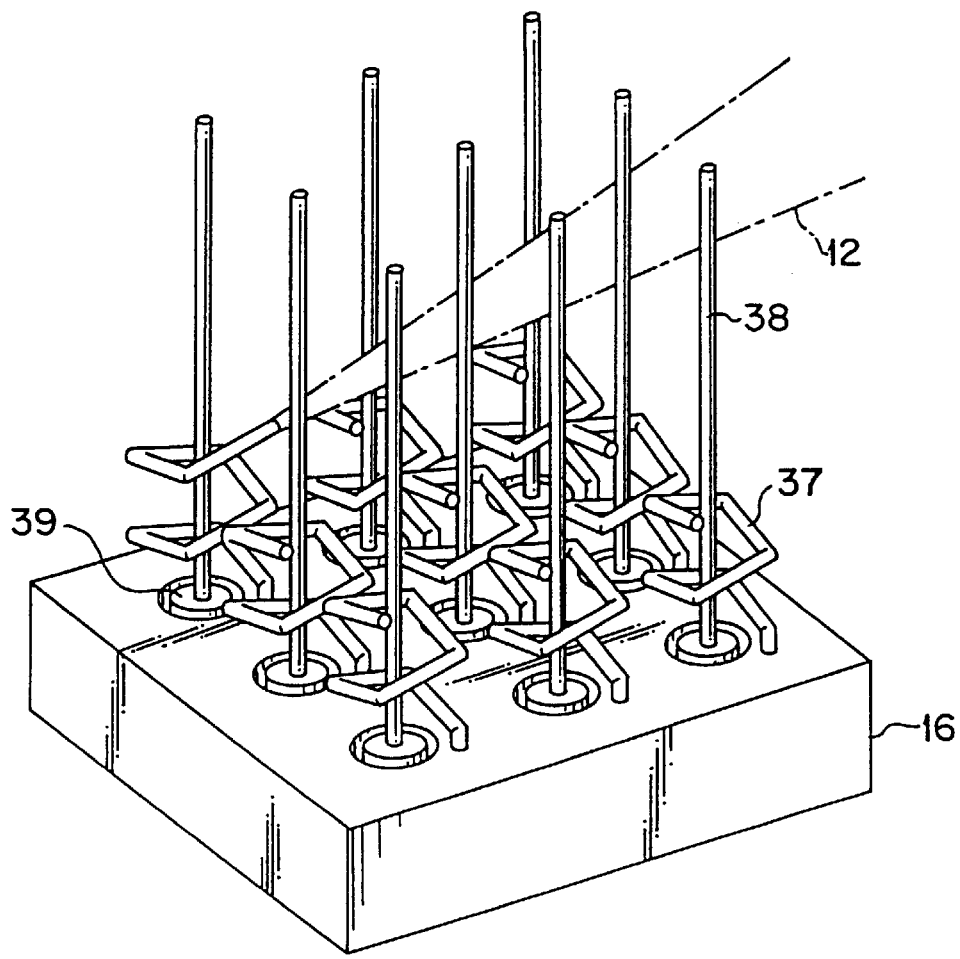
FIG. 5B is a perspective view of the array of square spirals in FIG. 5A.

An alternative to precisely controlling the laser intensity and/or rotation rate is to construct a square spiral helix as shown in FIGS. 5A and 5B. Square spirals 37 are created by forming each turn of the spiral from four straight segments with 90° rotation between segment growth. During each segment growth, the substrate only needs to be translated, not rotated, as for forming a linear fiber. The use of only translation means that the pulling direction easily remains coincident with the axis of a properly positioned laser beam, as shown in FIGS. 5A and 5B. Each square spiral 37 is formed around a linear fiber 38 which has been formed on an island 39 of the substrate 16 prior to the formation of the square spirals 37. This approach also allows arrays of spiral antennas to be readily grown as shown in FIGS. 5A and 5B. While the array in FIGS. 5A and 5B are shown as being formed sequentially, by providing an array of microlenses, one corresponding to each fiber to be grown, the growth can be performed simultaneously.

Figure 5C:
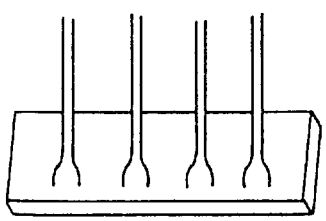
FIG. 5C is a perspective side view of an array of dipole antennas.

Other configurations can be formed, such as the dipole array formed from linear fibers shown in FIG. 5C. Clearly, arrays of any of the structures disclosed herein can be formed on the same substrate, especially using microlenses to form the elements of the array simultaneously. Further, using diffractive optics to provide a pattern at the focus rather than a spot, the fiber grown does not have to be solid. For example, diffractive optics may be used to provide a ring at the focus to form a hollow fiber.

Helical THz Antenna Design

Figure 6:
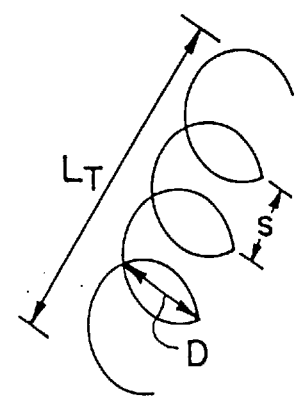
FIG. 6 illustrates helical antenna geometry.

A helical antenna can be pictured as a conductor coiled around an imaginary cylinder as shown in the FIG. 6. The conductor can be coiled in the clockwise or counterclockwise direction, thereby providing the desired circular polarization in accordance with this direction.

In FIG. 6, s is the spacing of turns in the helix, D is the diameter of the helix, C is the circumference of the helix or πD, a is the pitch angle of the helix, where $\tan \alpha = s/C = s/\pi D$, L is the length of a turn of the helix $L = \sqrt{S^2 + C^2}$, N is the number of turns, $L_T$ the total length of the helix, and d is the diameter of the helix wire. The pitch angle α provides a measure of how tightly the helix is wound. For a given circumference, smaller values of α imply closer turn spacing.

The operation of a helical antenna can be described in terms of transmission and radiation modes. Transmission modes describe how an electromagnetic wave propagates along the helix. At low frequencies, where the wavelength is much longer than the helix circumference, regions of positive and negative charge in the current distribution are separated by many turns. Because of this separation, the electric field becomes directed mainly along the axis of the helix. At frequencies where the wavelength approaches the length of the helix circumference, higher order transmission occurs.

The radiation field pattern depends on the radiation modes excited. There are mainly two modes; the normal mode and the axial mode. The axial mode antenna is the most widely used mode. Actually, the axial mode helical antenna is the most widely used circularly polarized antenna, either in space or on the ground. For the axial mode to occur, the frequency of operation must be such that the helix circumference is within the range 0.75 λ and 1.33 λ. The axial mode is characterized by a symmetric main lobe directed along the axis of the helix. On the other hand, for the normal mode the maximum field strength occurs in the direction perpendicular (normal) to the helix axis. The radiation resistance in this case is very low and hence the normal mode helix is not a very effective antenna. For a 1 THz axial mode antenna, dimensions of the helix are, e.g.:

C=341.307 μm
s=81.3 μm
d=15 μm
N=5 turns
α=13 degrees

Such an antenna can be formed using the LCVD in accordance with the present invention.

Substrate

As previously mentioned, laser power adjustments may be required to initiate and maintain growth from a substrate. Heat loss by conduction into a heat conducting substrate can require a much larger incident laser power to initiate the growth than to maintain the one-dimensional heat conduction from the tip of a growing fiber.

Figure 7A:
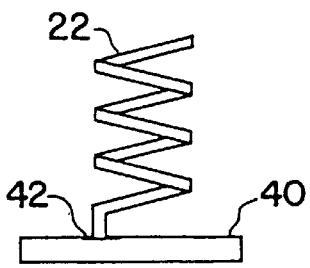
FIG. 7A is a side view of a helix formed on a paper substrate.

In practice, start-up is easily achieved from a paper substrate 40, shown in FIG. 7A, whose surface has a thin graphite layer 42, e.g., pencil lead to promote absorption of the incident laser power. The paper substrate 40 is then pulled through the region where the focussed laser beam is converging to the focal spot. The paper substrate 40 is heated and decomposed to a carbonaceous material that serves as a low conductivity substrate to initiate LCVD. As the focal point is approached, the carbonized paper surface achieves a temperature sufficient to initiate LCVD; a fiber is formed and quickly achieves steady-state growth at the same rate at which it is pulled.

However, for many applications, such as an antenna, it is desirable to grow the fiber 22 on an electrically conductive substrate, which is also typically thermally conductive as well. As noted above, there are problems associated with such substrates, since they absorb the needed heat from the laser beam, requiring more energy to reach the same initiation temperature. The configurations shown in FIGS. 7B and 7C use the same laser beam power required for start-up and steady-state LCVD with the paper substrate shown in FIG. 4A while providing conductive substrates. Thus, these configurations reduce the required start up power from that conventionally required for thermally conductive substrates.

Figure 7B:
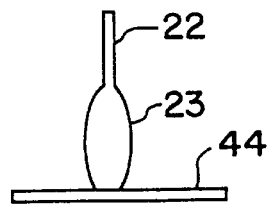
FIG. 7B is a side view of a helix formed on a steel substrate.

In FIG. 7B, the fiber 22 is grown on a steel substrate 44. Start up power requirements are reduced on the steel substrate 44 by using a very thin, e.g., on the order of 25 μm thick, steel strip substrate. Some uncontrolled deposition occurred during start-up, as shown by a larger-diameter deposit 23 formed during start-up on the steel substrate 44. By shuttering the laser beam as soon as a deposit begins to form and reducing the laser intensity, well-controlled growth is obtained at the reduced laser power, i.e., the power needed for steady state LCVD.

Figure 7C:
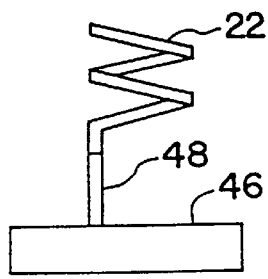
FIG. 7C is a side view of a helix formed on a semiconductor substrate.

In FIG. 7C, a semiconductor substrate 46, e.g., silicon or GaAs, is used and the laser power requirements for start-up were reduced by forming a column 48 by etching the surrounding semiconductor substrate 46. When using silicon, which has a high thermal conductivity, as the substrate, it is advantageous to use a mixture of ethylene and silane as the reactant gas. The column 48 is thin enough, typically on the order of 10 μm, such that the thermal conductivity is one dimensional and the heat can't escape fast enough, allowing the temperature to build up sufficient for initiation. The fiber 22 is then formed on this column 48. Nevertheless, some uncontrolled deposition can occur during start-up. The uncontrolled deposition can be avoided by making the column 48 have a length of approximately four times its diameter. Alternatively, or additionally, if the diameter at the tip of the column is made smaller than the focus spot of the laser, the column will absorb less of the energy, which can then be used for increasing the temperature. Again, by shuttering the laser beam as soon as a deposit begins to form and reducing the laser intensity, well controlled growth is obtained at the reduced laser power, i.e., the power needed for steady state LCVD.

When forming the columns in accordance with the present invention, the same methods of electro-deposition as the LIGA process (LIGA is a German acronym for a known electroforming/plating process) are utilized but do not require X-rays for exposing the photoresist, e.g., PMMA, because the thicknesses of the antenna are not too great. When using ultraviolet radiation to expose the PMMA prior to etching, the process is limited to layer thicknesses of approximately 25 microns.

Figure 8A:
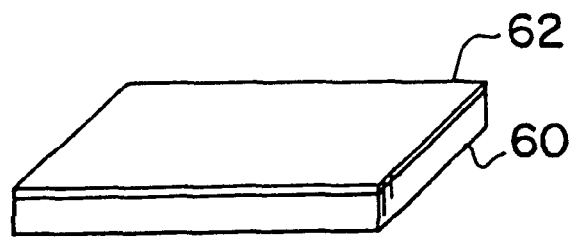
FIGS. 8A–8F show cross-sectional perspective view of steps in forming a column and ground plane on a semiconductor substrate on which a three-dimensional structure is to be formed.

The process steps are as follows as shown in FIGS. 8A–8F, which provide a cross-sectional view of the column and a circular ground plane being formed. While two columns and ground plane pairs are shown in these figures, an array of such pairs may be formed on the same substrate. In FIG. 8A, a substrate 60 on which the antenna is to be formed is provided. The substrate 60 is preferable silicon or GaAs, if an integrated circuit is to be used with the electrodeposited materials. Otherwise, the substrate 60 can be quartz, sapphire, or even the same fiberglass material used to fabricate printed circuit boards. Then, a layer of chromium is vapor deposited on the surface followed by a plating seed layer such as gold or copper to form a metalization layer 62 on the substrate 60.

Figure 8B:
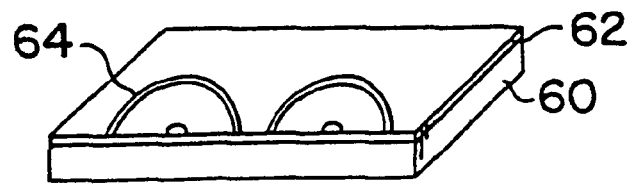
Figure 8C:
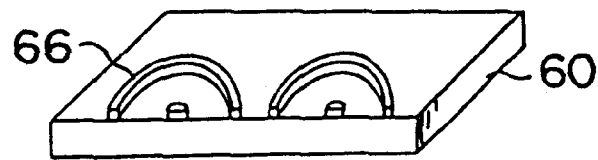

Then photoresist is spun onto the surface of the metalization layer 62 and baked. The photoresist is exposed with mask patterns to form a photoresist pattern 64 as shown in FIG. 8B. The metalization layer 62 is etched according to the photoresist pattern 64 to form a metal pattern 66 shown in FIG. 8C.

Figure 8D:
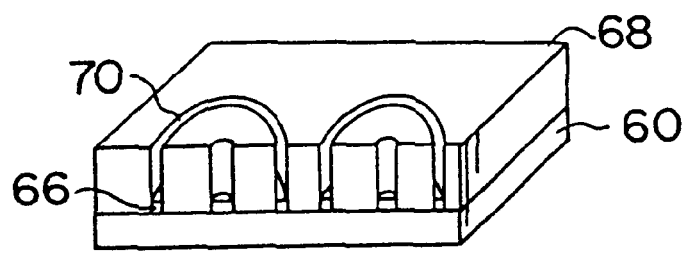
Figure 8E:
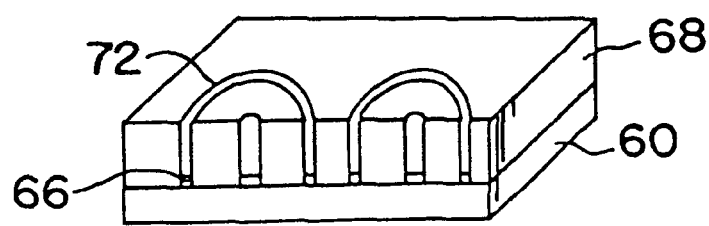

As shown in FIG. 8D, a layer 68 of photoresist, e.g., PMMA is deposited to the desired thickness of the plated metal layer which will be put on next. This is typically about 25 microns. The photoresist layer is then etched to provide openings 70 over the patterned metal 66. A metal layer 72 is used to electroplate the openings 70 in the photoresist layer 68 as shown in FIG. 8E.

Figure 8F:
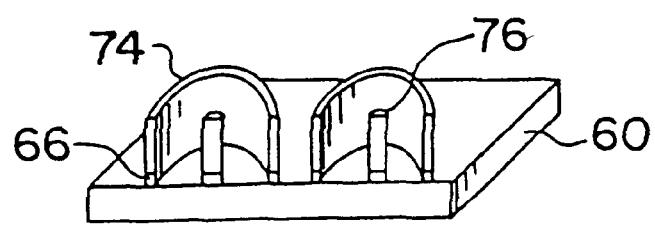

Finally, all the photoresist is washed away with a solvent leaving the metal structures on the substrate 60. The remaining metal structures form a circular ground plane cavity 74 and an antenna column 76, as shown in FIG. 8F. The antenna columns 76 are used as the initiation points for the LCVD process.

Thus, by either using a thin structure of by providing columns, a thermally conductive surface can be used as the surface on which a micro-structure grown using LCVD can be formed. Also in accordance with the present invention, this allows the initiation temperature to be reached and good steady state control. Alternatively, a non-thermally conducting surface could be used, the microstructure formed thereon, and then the surface metalized.

Detection with THz Antennas

Figure 9:
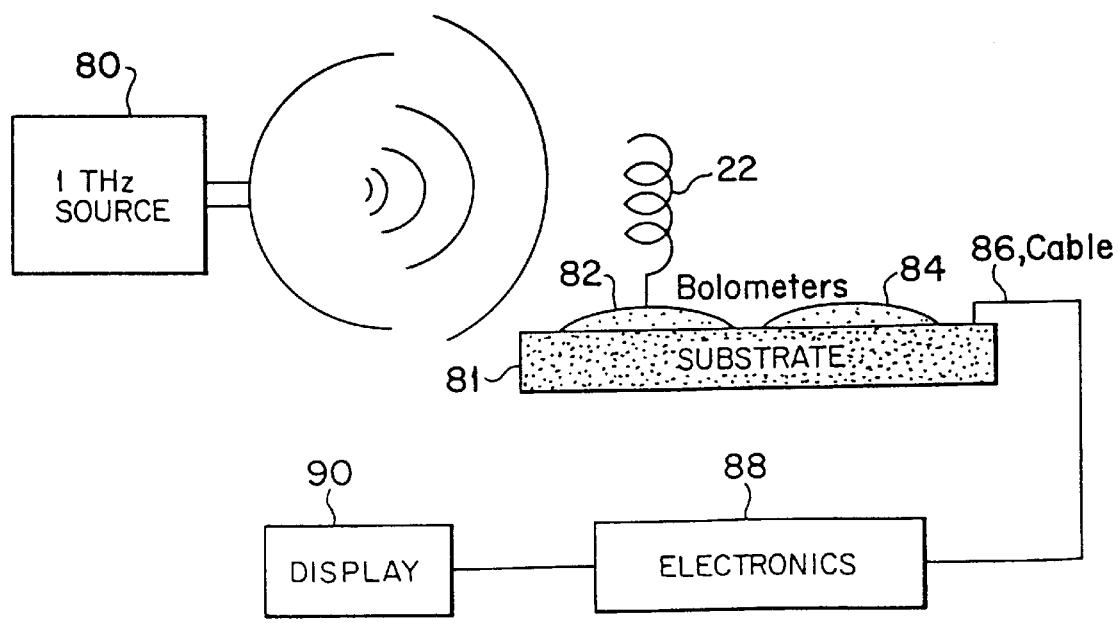
FIG. 9 is a schematic view of a system for measuring 1 THz radiation.

With the present state of solid-state technology, very few active components for the THz frequency region exist. Therefore, for use in the THz region, it is advantageous to form the antenna 22 in accordance with the present invention on a bolometer 82 to convert radiation from a 1 THz source 80 in the form of heat to a change in resistance in the bolometer 82, as shown in FIG. 9.

Preferably, two bolometers 82, 84 are used side-by-side, one with a helical antenna mounted thereon, serving as a measuring bolometer 82, and one without an antenna, serving as a compensating bolometer 84. The compensating bolometer 84 is used to negate the effects of bolometer heating due to incident radiation upon the bolometer structure itself. Heat transfer can occur by three methods: conduction, convection and radiation. For best results, it is desirable to limit heat transfer to conduction through the bolometer itself. Therefore, to minimize heat loss from the bolometer by convection, the evaluation system is placed in a low-pressure environment, such as an evacuated Bell jar. Heat loss due to radiation may be significant and could result in a decrease in bolometer sensitivity. The amount of radiative heat loss from the bolometer partially depends on the emissivity of the bolometer material. Low frequency, conventional electronics 88 are used to measure the increase in resistance due to heating from the received radiation. The change in resistance may be displayed on a display 90.

The measuring bolometer 82 serves three functions. It is used to measure the amount of THz radiation received by the antenna 22 and coupled to it by changing resistance based upon its temperature change- It is the mechanical base to which the antenna attaches. It also acts as the ground plane for the helical antenna.

The material used to make the bolometer should have a high melting point, so it will not melt during initiation of the LCVD process, should be able to be sputtered onto silicon substrates to form thin films, and should have high temperature coefficient of resistance, e.g., 0.004° C., for sufficient sensitivity. Suitable materials include chromium, iron, nickel, platinum and tungsten.

The bolometer is designed to be a suspended bridge structure as shown in FIG. 9 to prevent eutectic problems, to maximize heat transfer through the bolometer structure and to limit heat transfer to the silicon substrate to the two ends of the structure. The above mentioned bolometer materials also have sufficient mechanical strength to support its own weight and the weight of the antenna formed thereon.

Figure 10:
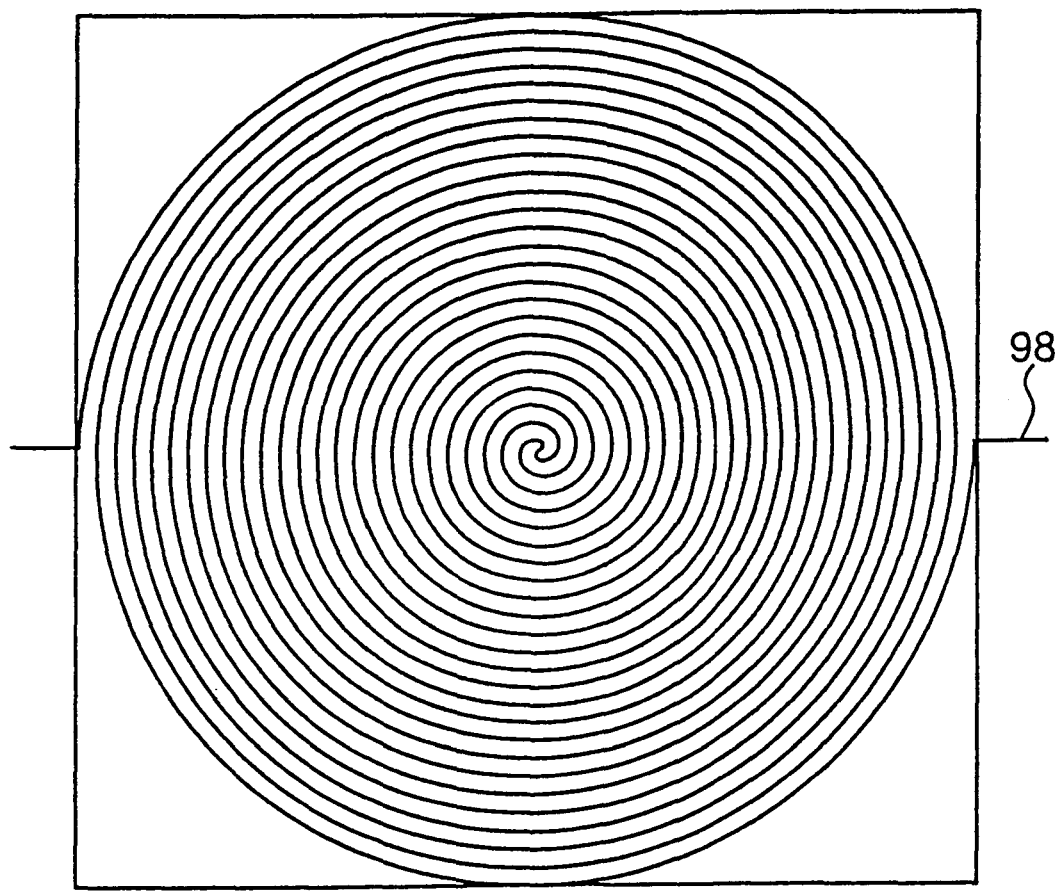
FIG. 10 is a top view of a bolometer for use in the system of FIG. 9.

To maximize the length of the suspended bolometer structure while minimizing the cross sectional area, a double spiral configuration formed from a strand 98 of bolometer material is preferably used, as shown in FIG. 10. The LCVD helical antenna is grown in the center of the spiral. When the bolometer forms a 1 mm square, for example, the bolometer strand 98 has a suspended length of 39.27 mm and a width of 10 μm. The height of the bolometer strand 98 is varied to obtain the desired impedance to match the antenna, thereby providing effective power transfer between the helical antenna and the bolometer.

Figure 11A:
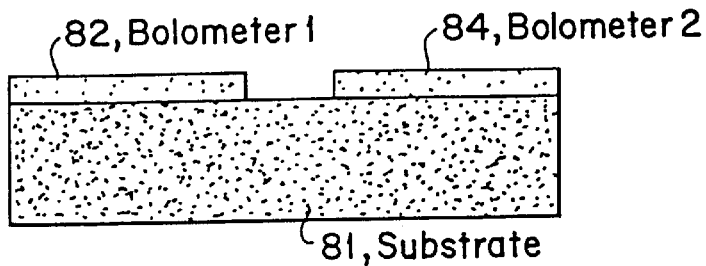
FIGS. 11A–11E show a side view of steps in forming the bolometer structure of FIG. 9.

The fabrication of the bolometer/antenna unit begins with the semiconductor substrate. Different substrate materials can be used, including Si and GaS. Although only one dice is shown, many dies could or would be fabricated on a substrate wafer. The substrate is cleaned and patterned with a photoresist layer to define the area on which the bolometers are to be fabricated. Two bolometers are fabricated side-by-side, a pair for each antenna, as shown in FIG. 11A. The helical antenna 22 is grown in the center of one of the bolometers 82 using the LCVD process while the other bolometer 84 is used to negate the effects of bolometer heating due to incident radiation upon the bolometers directly. The bolometer structure is deposited by sputtering, with the time of sputtering used to build up the desired material thickness. FIG. 11A shows the substrate with two the bolometer material deposited thereon where the bolometer structures are to be formed.

Figure 11B:
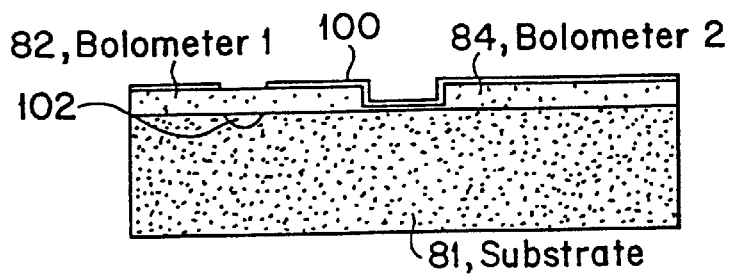

As shown in FIG. 11B, the substrate 81 is then covered with a photoresist 100 and patterned so that a pit 102 can be etched under the center of the bolometer to have the antenna formed thereon. This pit 102 allows the antenna structure to be fabricated on the bolometer center, since the pit 102 serves to reduce the thermal conductivity of the bolometer, thus reducing the intensity required for reaching initiation temperatures for LCVD. The hardened photoresist 100 is left on the rest of the substrate to pattern it for the later step of electroplating.

Figure 11C:
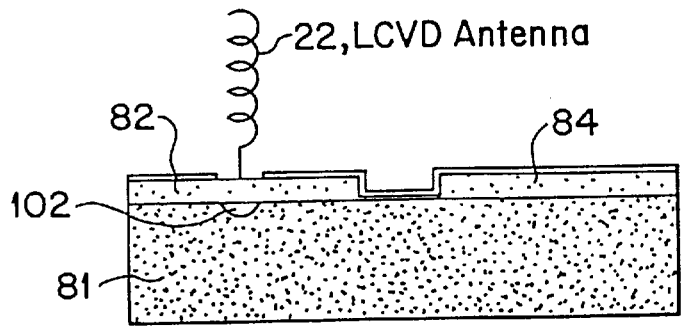
Figure 11D:
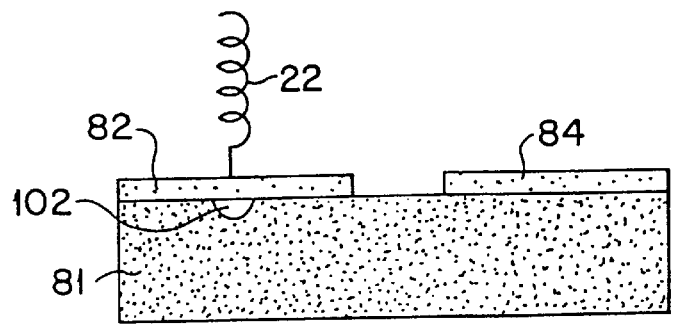

The helical antenna 22 is now grown on the center of the bolometer 82 with the pit 102 under it using the LCVD process as shown in FIG. 11C. A thin layer of gold is then deposited on the antenna structure and the exposed bolometer strand using electroplating. This increases the conductivity and the mechanical strength of the antenna. Then the remaining photoresist 100 is removed, as shown in FIG. 11D.

Figure 11E:
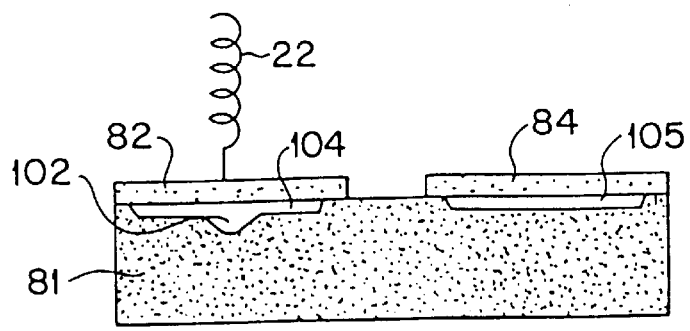

Next, the substrate is again patterned with photoresist to define the entire area under the bolometers to be etched to form the suspended bolometers. Then this area of the substrate is etched away. Then the remaining hardened photoresist is removed, resulting in the finished bolometer/antenna unit shown in FIG. 11E in which the bolometers 82, 84 are now suspended above the substrate 81 over gaps 104, 105, respectively, while still being attached to the substrate 81 at their ends.

Thus, in accordance with the present invention, the antenna formed by LCVD can be directly formed on a bolometer and used to detect THz radiation. This bolometer also serves as the ground plane for the antenna.

Additional Applications for the LCVD Process

Spiral microstructures were formed with diameters ranging from 40 μm to approximately 1.1 mm, which demonstrates the feasibility of LCVD fabrication of helical antennas for operation in the frequency range from 100 GHz to 2.7 THz. One application is a high frequency spectrum analyzer. Arrays of antennas, dipole or helical, can be fabricated on the same substrate to monitor frequencies from 100 GHz to over 2 THz. Each antenna has a calibrated bolometer matched to its impedance. The bolometer resistances are converted to voltages with conventional electronics. The output voltages represent the signal levels present at discrete frequency bands.

Another application is for high resolution scanners operating in the far-infrared (FIR) frequency band. Arrays of micro helical antennas would be used with FIR optical lenses to produce such an imaging device.

Further, iron fibers can be created using the LCVD process of the present invention using volatile iron pentacarbonyl. Iron fibers, which are ferromagnetic, can be used to form micro-transformers and electromagnetic actuators, such as micro-switches, micro-relays, micro-electromagnets, etc., or for imaging materials with magnetic properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a three-dimensional electromagnetic device comprising:
   providing a conductive surface; and
   laser chemical vapor depositing a three-dimensional structure on said conductive surface, thereby forming the electromagnetic device, wherein the electromagnetic device is an antenna and said conductive surface serves as a ground plane for the antenna.

2. A method of forming a three-dimensional electromagnetic device comprising:

providing a conductive surface; and laser chemical vapor depositing a three-dimensional structure on said conductive surface, thereby forming the electromagnetic device, wherein said step of providing includes forming a bolometer and said step of depositing forms the three dimensional structure on the bolometer.

3. The method according to claim 2, further comprising forming a pit under a center of the bolometer and performing the depositing on a portion of the bolometer over the pit.

4. The method according to claim 2, wherein the forming of the bolometer further comprises suspending the bolometer on a conductive substrate.

5. The method according to claim 2, further comprising forming a compensating bolometer for the antenna.

6. A method of forming a three-dimensional electromagnetic device comprising:

providing a conductive surface; and laser chemical vapor depositing a three-dimensional structure on said conductive surface, thereby forming the electromagnetic device, wherein the electromagnetic device is an array of electromagnetic devices.

7. The method according to claim 6, wherein said depositing of each device of said array occurs simultaneously.

8. A method of growing three-dimensional structures on a thermally conductive substrate comprising:

forming a column on the thermally conductive substrate; and laser chemical vapor depositing the three dimensional structure, including focussing a laser beam on the column, wherein said step of forming includes providing a tip on the column, the tip having a diameter which is less than a diameter of a focal point of the laser.

9. A method of growing three-dimensional structures on a thermally conductive substrate comprising:

forming a column on the thermally conductive substrate; and laser chemical vapor depositing the three dimensional structure, including focussing a laser beam on the column, wherein said step of forming includes providing a column having a height which is at least four times its diameter.

10. An electromagnetic device comprising:

a conductive surface; and a fiber grown by laser chemical vapor deposition and having a three-dimensional structure formed on the conductive surface.

11. The electromagnetic device as recited in claim 10, wherein said fiber having a three dimensional structure has an axis not parallel to said conductive surface.

12. The electromagnetic device as recited in claim 10, wherein the three-dimensional structure is a helix.

13. The electromagnetic device as recited in claim 12, wherein the helix is a square helix.

14. The electromagnetic device as recited in claim 10, wherein the three-dimensional structure is an array of dipoles.

15. The electromagnetic device according to claim 10, wherein the conductive surface is a bolometer.

16. The electromagnetic device according to claim 10, wherein the three-dimensional structure is a ferromagnetic structure.

17. The electromagnetic device according to claim 16, wherein the ferromagnetic structure is used as an imaging device.

18. The electromagnetic device according to claim 16, wherein the ferromagnetic structure is used as an electromagnetic actuator.

19. A substrate on which a structure grown by laser chemical vapor deposition is to be formed comprising a thermally conductive surface and a thermally conductive column formed on the thermally conductive surface, the growth of the structure being initiated on said thermally conductive column, wherein the tip of the column has a diameter which is less than a diameter of a focal point of a laser used for the laser chemical vapor deposition.

20. A substrate on which a structure grown by laser chemical vapor deposition is to be formed comprising a thermally conductive surface and a thermally conductive column formed on the thermally conductive surface, the growth of the structure being initiated on said thermally conductive column, wherein the column has a height which is at least four times its diameter.

* * * * *